United States Patent
Airey et al.

(10) Patent No.: US 10,238,121 B2
(45) Date of Patent: Mar. 26, 2019

(54) STUNNER/KILLER ELECTRODE PLATE AND TROUGH

(71) Applicant: SIMMONS ENGINEERING COMPANY, Dallas, GA (US)

(72) Inventors: Jeffrey L. Airey, Federalsburg, MD (US); Derrick C. Arp, Blue Ridge, GA (US); Stephan A. Clay, Cedartown, GA (US)

(73) Assignee: Simmons Engineering Company, Dallas, GA (US)

( * ) Notice: Subject to any disclaimer, the term of this patent is extended or adjusted under 35 U.S.C. 154(b) by 0 days.

(21) Appl. No.: 15/586,970

(22) Filed: May 4, 2017

(65) Prior Publication Data

US 2018/0317504 A1 Nov. 8, 2018

(51) Int. Cl.
| | | |
|---|---|---|
| A22B 3/00 | (2006.01) | |
| A22B 3/06 | (2006.01) | |
| A22B 3/08 | (2006.01) | |
| A22B 1/00 | (2006.01) | |

(52) U.S. Cl.
CPC ............ *A22B 3/06* (2013.01); *A22B 1/00* (2013.01); *A22B 3/086* (2013.01)

(58) Field of Classification Search
CPC ............. A22C 21/00; A22B 3/06; A22B 7/00
USPC ................................................. 452/57–59
See application file for complete search history.

(56) References Cited

U.S. PATENT DOCUMENTS

| | | | | |
|---|---|---|---|---|
| 3,828,397 A | * | 8/1974 | Harben, Jr. ............ | A22B 3/06 452/59 |
| 3,918,123 A | * | 11/1975 | Harben, Jr. ............ | A22B 3/086 452/59 |
| 4,092,761 A | * | 6/1978 | McWhirter ............ | A22B 3/086 452/58 |
| 4,153,971 A | * | 5/1979 | Simonds ................ | A22B 3/06 452/59 |
| 4,694,534 A | * | 9/1987 | Simmons .............. | A22B 3/06 452/59 |
| 5,954,572 A | * | 9/1999 | Kettlewell ............ | A22B 3/06 452/58 |
| 6,019,674 A | * | 2/2000 | Austin .................. | A22B 3/06 452/58 |

(Continued)

OTHER PUBLICATIONS

International Search Report for PCT Serial No. PCT/US18/30673 dated Jun. 8, 2018.

*Primary Examiner* — Richard T Price, Jr.

(74) *Attorney, Agent, or Firm* — Gardner Groff Greenwald Villanueva, P.C.

(57) ABSTRACT

A poultry stunning apparatus including a trough for containing water through which the poultry is carried for stunning. The apparatus also including an electrical control module configured to apply a DC current to the poultry at a voltage sufficient to stun the poultry and to apply AC current to the stunned poultry at a voltage and for a period of time sufficient to immobilize and relax the muscles of the stunned poultry, while at the same time avoiding or minimizing damage to the poultry tissue. The apparatus further including a stunning electrode positioned within the trough, the stunning electrode including a metal plate adapted and positioned within the trough to be contacted in a contact zone by the poultry as the poultry are carried along, the contact zone of the metal plate being substantially smooth and uninterrupted.

15 Claims, 11 Drawing Sheets

(56) References Cited

U.S. PATENT DOCUMENTS 6,132,303 A * 10/2000 Buckhaven .............. A22B 3/06
                   452/1
6,135,872 A * 10/2000 Freeland .............. A01K 45/005
                   452/57

* cited by examiner

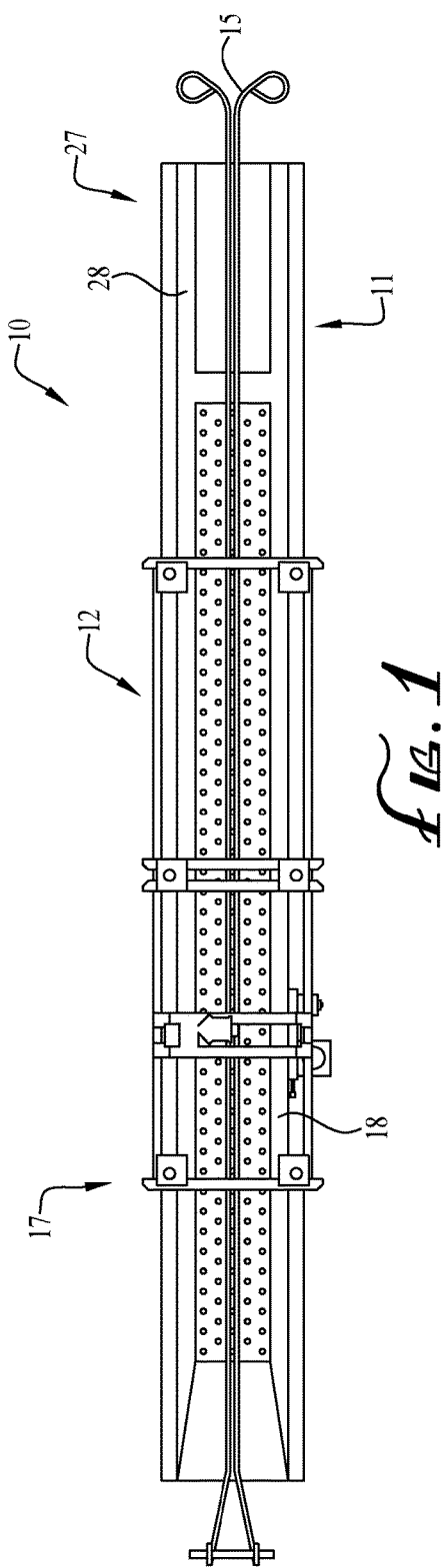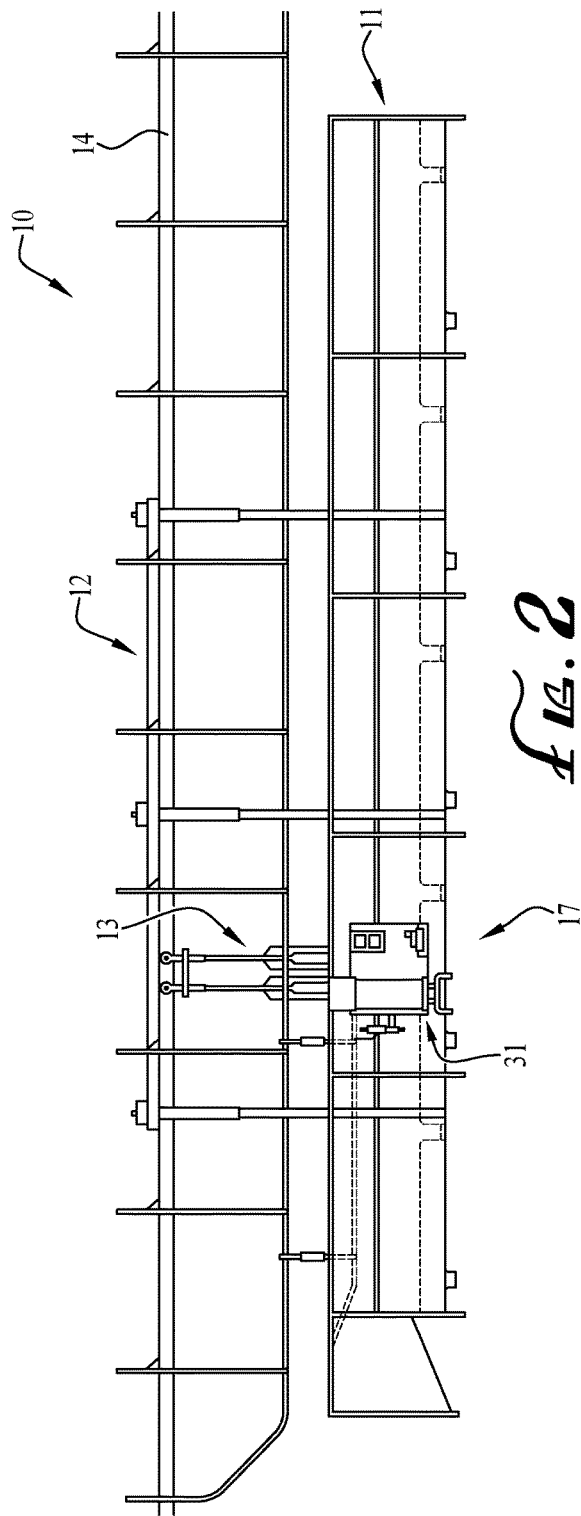

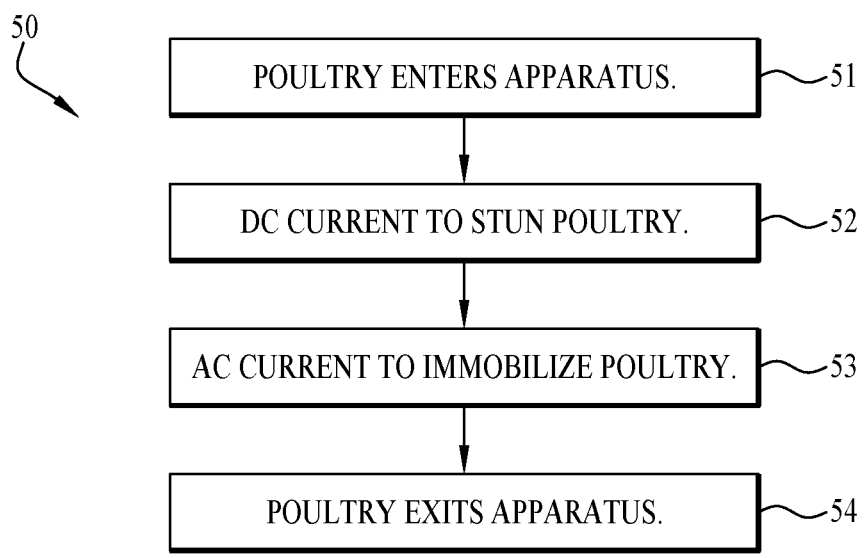

STUNNER/KILLER ELECTRODE PLATE AND TROUGH

BACKGROUND

In slaughtering poultry, it is common to first stun the poultry, then kill the stunned poultry, and then to process the killed poultry. In stunning the poultry, it is desirable to avoid damaging the poultry tissue and to minimize movement of the poultry.

In known prior stunner systems, a pulsating low DC voltage has been applied. The pulsating DC voltage, usually in the 10-14 volt range for chickens, 14-18 volts for small turkeys, and 30-35 volts for larger turkeys, works well for most poultry processors. However, such pulsating DC voltages are not acceptable for those localities requiring a so-called "stun-to-kill" approach.

In general, most stunners used outside North America are based upon a design developed in Western Europe. These European stunners operate as "water bath" stunners. This means that the birds' heads and necks are dragged through a tank of electrically charged water. This results in a very inconsistent stun, and, when combined with European style killing machines which cut only one side of the bird's neck, results in birds still being alive when reaching the scalder. This is the main reason that many European countries now require the "stun-to-kill" practice.

However, when a bird is killed in a stunner with electrical current, there is a very strong possibility of causing damage to the carcass, such as broken bones and hemorrhaging of blood vessels. Poultry processors have been looking for alternative stunning methods to improve the "stun-to-kill" procedure so that the birds can be stunned with less resulting product damage.

U.S. Pat. No. 6,019,674 of Simmons provided a step forward in the art. As described in that patent, a saline solution is contained in an elongated trough, which is mounted at the end portions of four non-electronically conducting posts. The trough is filled with saline solution. The trough has an ingress funnel arrangement designed to control the thrashing of to-be-electrically stunned birds and an elongated grid having a portion immersed in the solution and a downstream portion out of the solution. The four posts extend upwardly and terminate in threaded portions. A frame carriage is provided which has four corners, and at the four corners are suitably mounted driven gears with internal bores and threads adapted to engagingly rotate about the threaded portions of the ports. The carriage is suitably affixed to a conventional I-beam to which is movingly mounted a conventional endless cable and space shackle system for conveying birds in an upside-down manner. The four mounted gears are rotatable in unison by a chain drive which may be manual, hydraulic, pneumatic or electric, whereby the trough may be selectively moved upwardly or downwardly as found necessary to vary the distance between the I-beam and the trough to accommodate different sized shackles and/or birds. The trough has a short extension to provide a first section and a second section. Both sections include a grate through which the bird's head is dragged.

In the first section, a pulsating DC current operating at a relatively low voltage (9-30 volts) is applied via an electrical connection, such that electricity is applied to a grate in each section. The overhead shackle line carrying the birds is at a polarity which is opposite to the polarity of electricity being supplied to the stainless steel surface submerged in saline solution and the trough. In the second section, a low AC current operating at about 30 volts is applied via the electrical connection between the shackles and the trough. The second section of the extension is electrically isolated from the first section of the main or first section of the trough. The speed of the conveyer is such that the poultry are subjected to the low voltage AC current in the extension for a period of only about two to three seconds.

SUMMARY OF THE INVENTION

According to an illustrative embodiment, a poultry stunning apparatus, includes a trough for containing water through which the poultry is carried for stunning and an electrical control module configured to apply a DC current to the poultry at a voltage sufficient to stun the poultry. A stunning electrode is positioned within the trough, the stunning electrode comprising a substantially smooth metal plate adapted and positioned within the trough and comprising a contact zone for contacting the poultry as the poultry is carried along through the trough, the contact zone of the metal plate being substantially smooth and uninterrupted.

Preferably, the stunning electrode is pivotally mounted within the trough by way of one or more hinges.

Optionally, the electrical control module is configured to apply AC current to the stunned poultry at a voltage and for a period of time sufficient to immobilize and relax the muscles of the stunned poultry.

Preferably, the stunning electrode is mounted within the trough for pivotal motion between a lowered position and a raised position.

In another illustrative embodiment, a poultry stunning apparatus includes a trough for containing water through which the poultry is carried for stunning and an electrical control module configured to apply electric current to the poultry to stun the poultry. A stunning electrode is positioned within the trough, the stunning electrode comprising a metal plate including a contact zone portion thereof adapted and positioned within the trough to be contacted by the poultry as the poultry is carried along, wherein the stunning electrode is pivotally mounted within the trough for pivotal movement between a lowered position and a raised position.

Preferably, the stunning electrode is mounted for pivotal motion by way of one or more hinges. Optionally, the stunning electrode is mounted to a first side of the trough.

Preferably, the contact zone of the metal plate is substantially smooth and uninterrupted.

In another illustrative embodiment, a poultry stunning apparatus includes a generally V-shaped trough having a first side, a second side, and a bottom portion and a stunning electrode pivotally coupled to the trough, the stunning electrode comprising a metal plate adapted and positioned within the trough to be contacted in a contact zone by the poultry as the poultry is carried along.

Preferably, the stunning electrode is pivotally coupled to the trough by way of one or more hinges.

Optionally, the pivotal rotation of the stunning electrode into the bottom portion of the trough is limited by way of a shelf. Preferably, the contact zone of the metal plate is substantially smooth and uninterrupted.

Preferably, the trough is made of electrically non-conducting material, such as fiberglass.

In another illustrative embodiment, a poultry stunning apparatus operates such that a DC voltage/current is applied for initial stunning, followed by an AC voltage/current to immobilize poultry and to further relax the muscles of the stunned poultry, such that the poultry does not exhibit involuntary motions, while at the same time avoiding or minimizing damage to the poultry tissue.

In one example embodiment, an apparatus comprises a poultry stunning apparatus, including an electrical control module configured to apply a DC current to the poultry at a voltage sufficient to stun the poultry and to apply AC current to the stunned poultry at a voltage and for a period of time sufficient to immobilize and relax the muscles of the stunned poultry, while at the same time avoiding or minimizing damage to the poultry tissue.

Optionally, the AC current is applied at a medium voltage of between about 60 and 250 VAC. Preferably, the AC current is applied at a voltage of between about 60 and 130 VAC. Most preferably, the AC current is applied at a voltage of between about 70-90 VAC.

In another example embodiment, the invention relates to a method for stunning poultry, including the steps of applying a DC current to poultry at a voltage sufficient to stun the poultry; and applying an AC current to the stunned poultry at a voltage and for a period of time sufficient to immobilize and relax the muscles of the stunned poultry, while at the same time avoiding or minimizing damage to the poultry.

BRIEF DESCRIPTION OF THE DRAWINGS

FIG. 1 is a top view of a stunning apparatus according to an example embodiment of the present invention.

FIG. 2 is a side view of a stunning apparatus according to FIG. 1.

FIG. 7 is a schematic flow chart of a method of operation of the stunning apparatus of FIG. 1.

DETAILED DESCRIPTION

Figure 3:
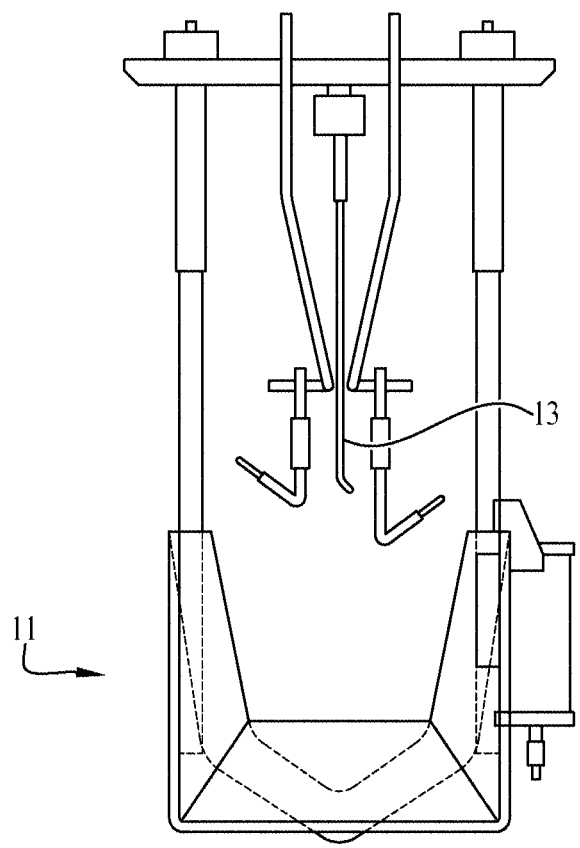
FIG. 3 is an end view of a stunning apparatus of FIG. 1.
Figure 4:
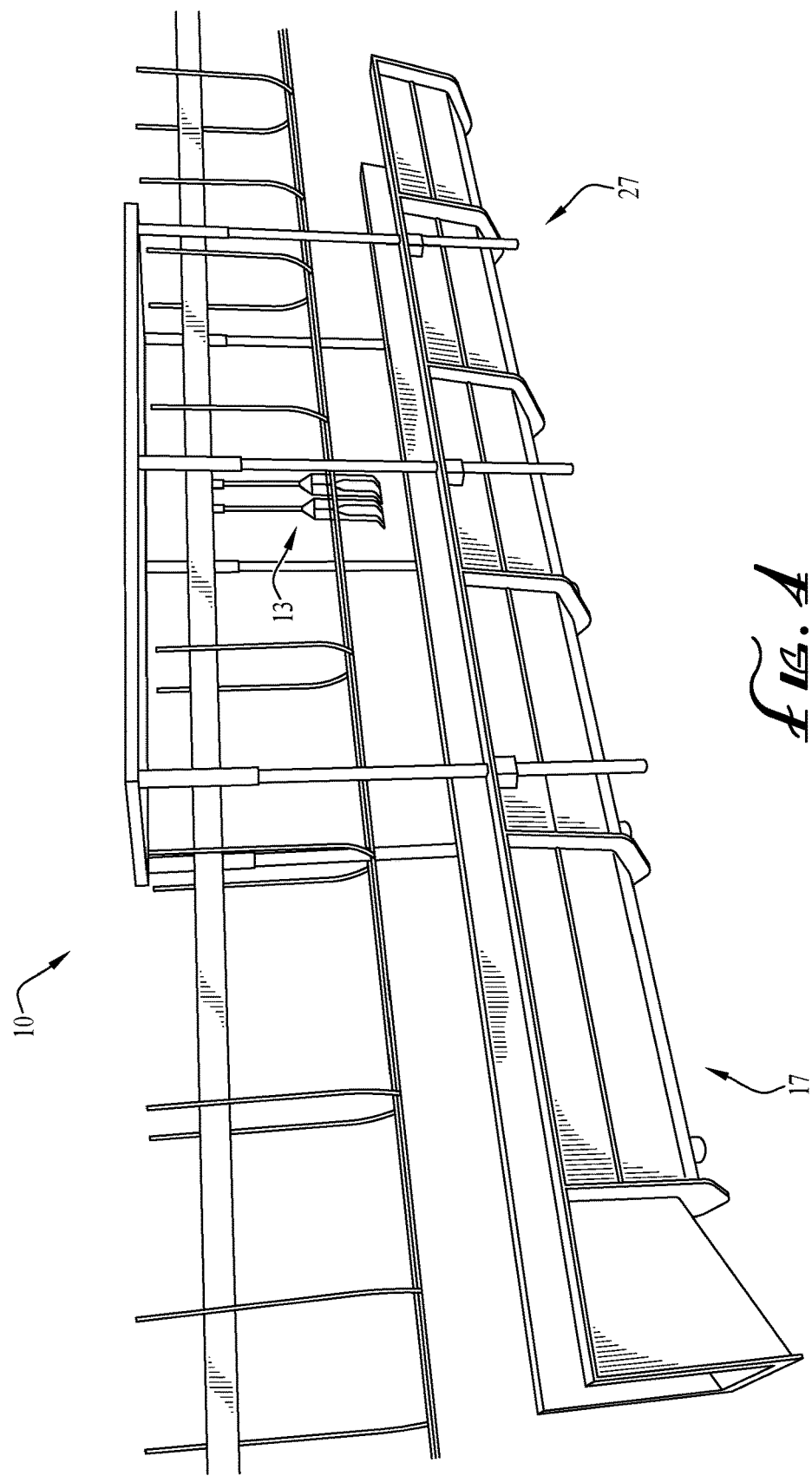
FIG. 4 is a perspective view of a stunning apparatus according to an example embodiment.
Figure 5:
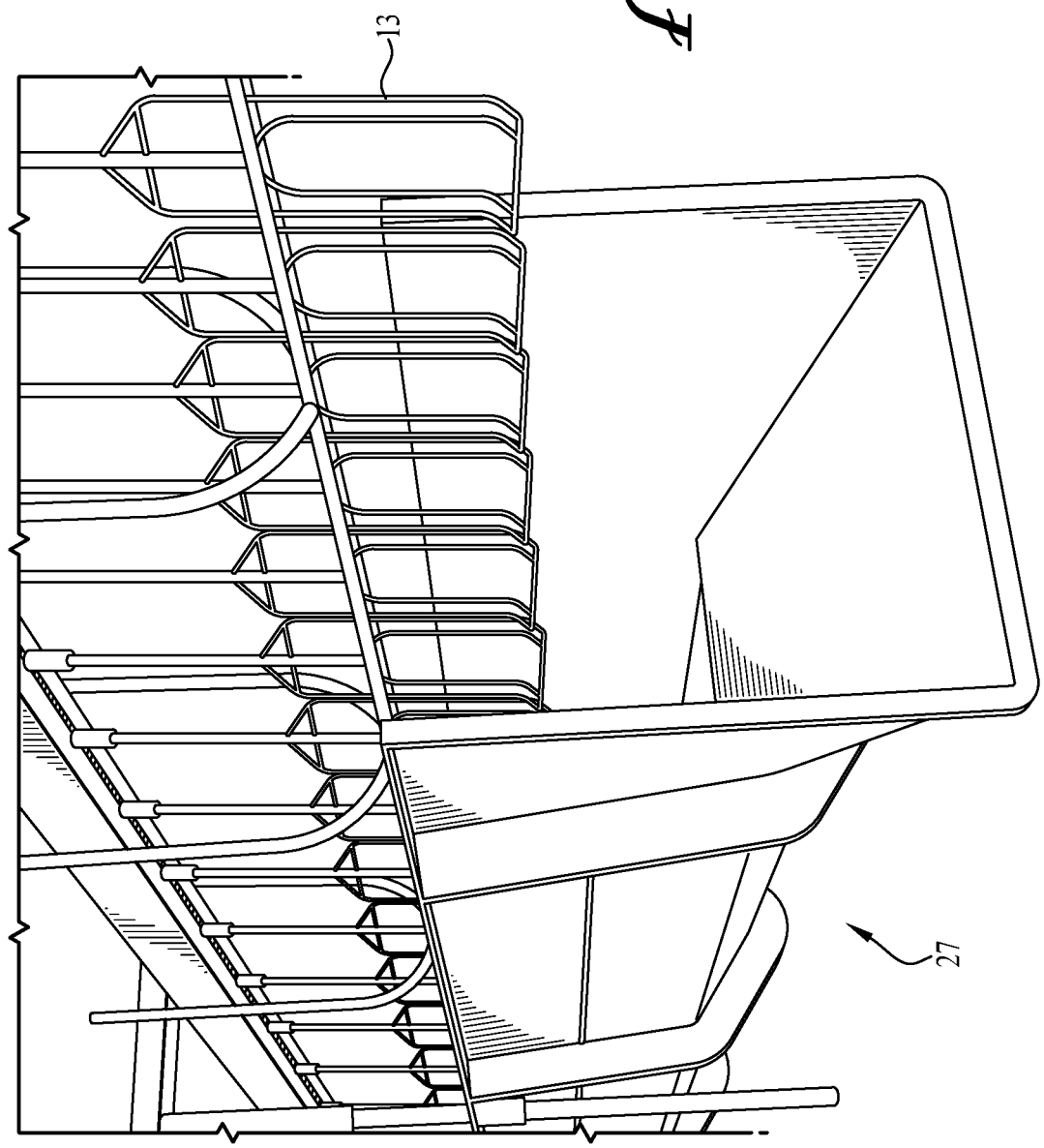
FIG. 5 is a perspective view of a stunning apparatus of FIG. 4.

With reference now to the drawing figures, wherein like reference numbers represent corresponding parts throughout the several views, FIGS. 1-5 show a direct current/alternating current poultry stunning and immobilizing apparatus 10 according to an example embodiment of the present invention. The device generally includes a stunner cabinet 11, an overhead support frame 12, and kill line shackles 13 attached to a pre-existing overhead track 14. Such an overhead track 14 is a common feature in many poultry processing plants.

According to an illustrative embodiment, an apparatus and method are provided for applying a low voltage DC current to poultry to stun the poultry and then applying an AC current to the poultry at a sufficient voltage and for a sufficient period of time to immobilize the poultry without damaging the tissue.

Referring to FIGS. 1 and 2, which show top and side views of the poultry stunning device 10, including a stunner cabinet 11 which forms an elongated U-shaped basin (see FIGS. 3-5), the stunner cabinet 11 is open at each end to allow poultry to enter the cabinet 11 at a first end and exit at the second end. The cabinet 11 includes a DC stunner portion 17 situated near the first end of the cabinet, and an AC stunner portion 27 situated near the second end of the cabinet. The DC stunner portion 17 includes a recessed area capable of retaining water. The DC stunner portion 17 also includes a DC stunner contact grate 18. In example embodiments, the DC stunner grate 18 is positioned at the bottom of the recessed area of the DC stunner portion 17. The AC stunner portion 27 likewise includes an AC stunner contact grate 28. The DC stunner grate 18 and the AC stunner grate 28 are made of electrically conductive material, such as stainless steel. The DC stunner contact grate 18 and the AC stunner contact grate 28 are electrically isolated from each other. The power supplies coupled to the DC stunner contact grate 18 and the AC stunner contact grate 28 are protected, for example, by a NEMA 4X stainless steel enclosure.

The stunner cabinet 11 also includes a salt water injection system 31 located in the DC stunner portion 17. The salt water injection system 31 is designed to fill and maintain a level of salt water in the recessed area of the DC stunner portion 17. The salt water injection system 31 can include an optional electronic control to ensure the salt water contains the proper saline level for delivering electric current. The cabinet 11 can include an optional pneumatic adjustment system to adjust the height of the cabinet 11 such that it can accommodate a variety of types and sizes of poultry.

The apparatus 10 also includes an overhead support frame 12 to support an existing overhead track. The overhead support frame 12 supports an overhead conveying track to which kill line shackles 13 are connected, as shown in FIGS. 2 and 3. The kill shackles 13 are made of electrically conductive material and are designed to support poultry in an inverted position so that the bird hangs upside-down with the bird's head oriented toward the bottom of the stunner cabinet 11. The overhead support frame 12 and overhead track 14 are suitably affixed to a guide bar system 15, which is movingly mounted to a conventional endless cable and space shackle system for conveying birds in an upside-down manner understood by those skilled in the art. Optionally, an insulated rump bar and breast bar can also be used to support and hold poultry in an inverted position. In other embodiments, the apparatus can include an optional guide bar kit for accommodating plastic shackles.

The apparatus 10 can be of a modular construction which allows for additional sections to be added without replacing the entire system. The apparatus can also include a digital display and/or a voltage data logger.

Figure 6A:
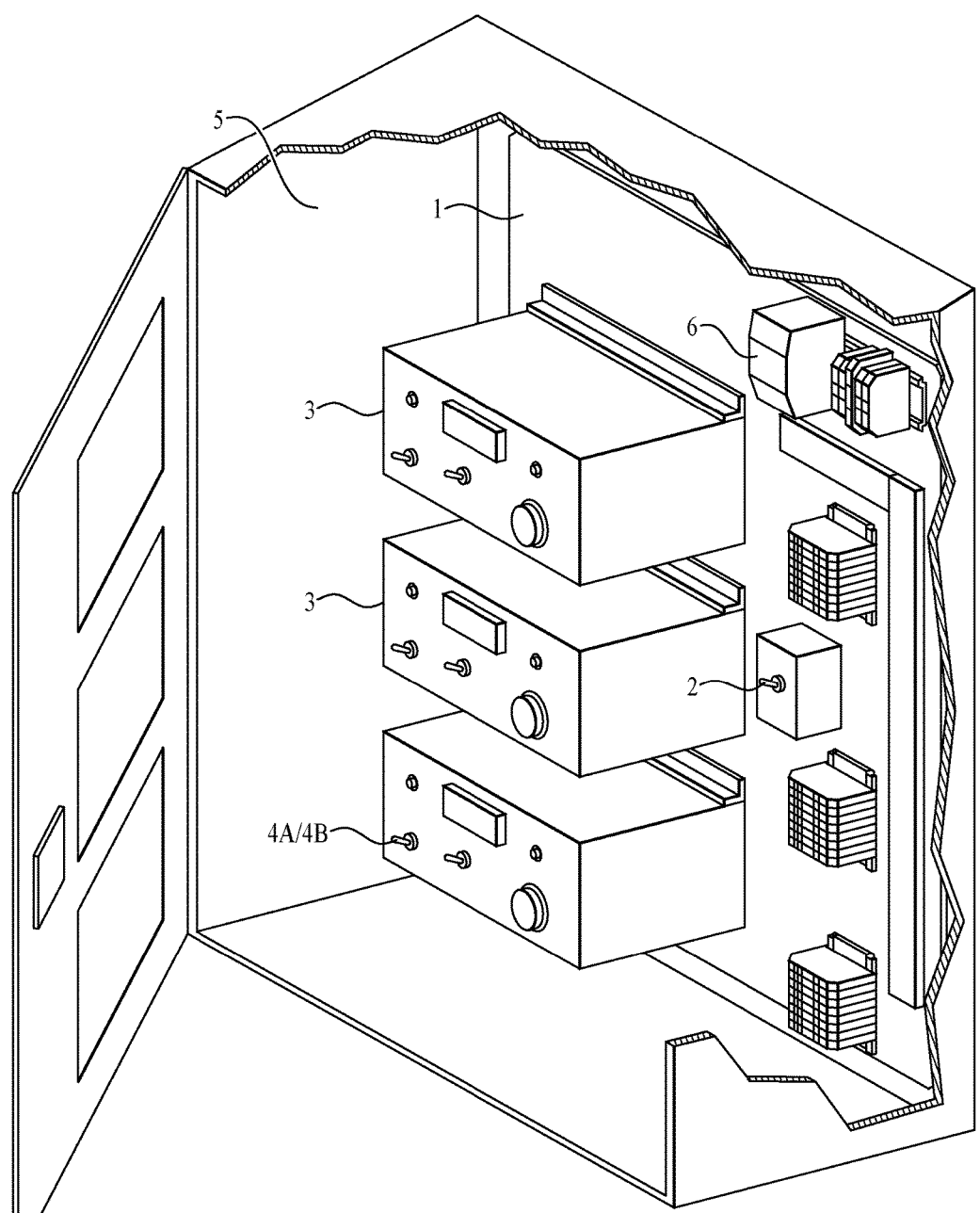
FIG. 6A is a perspective view of an electronics housing portion of the stunning apparatus of FIG. 1 and contents thereof.
Figure 6B:
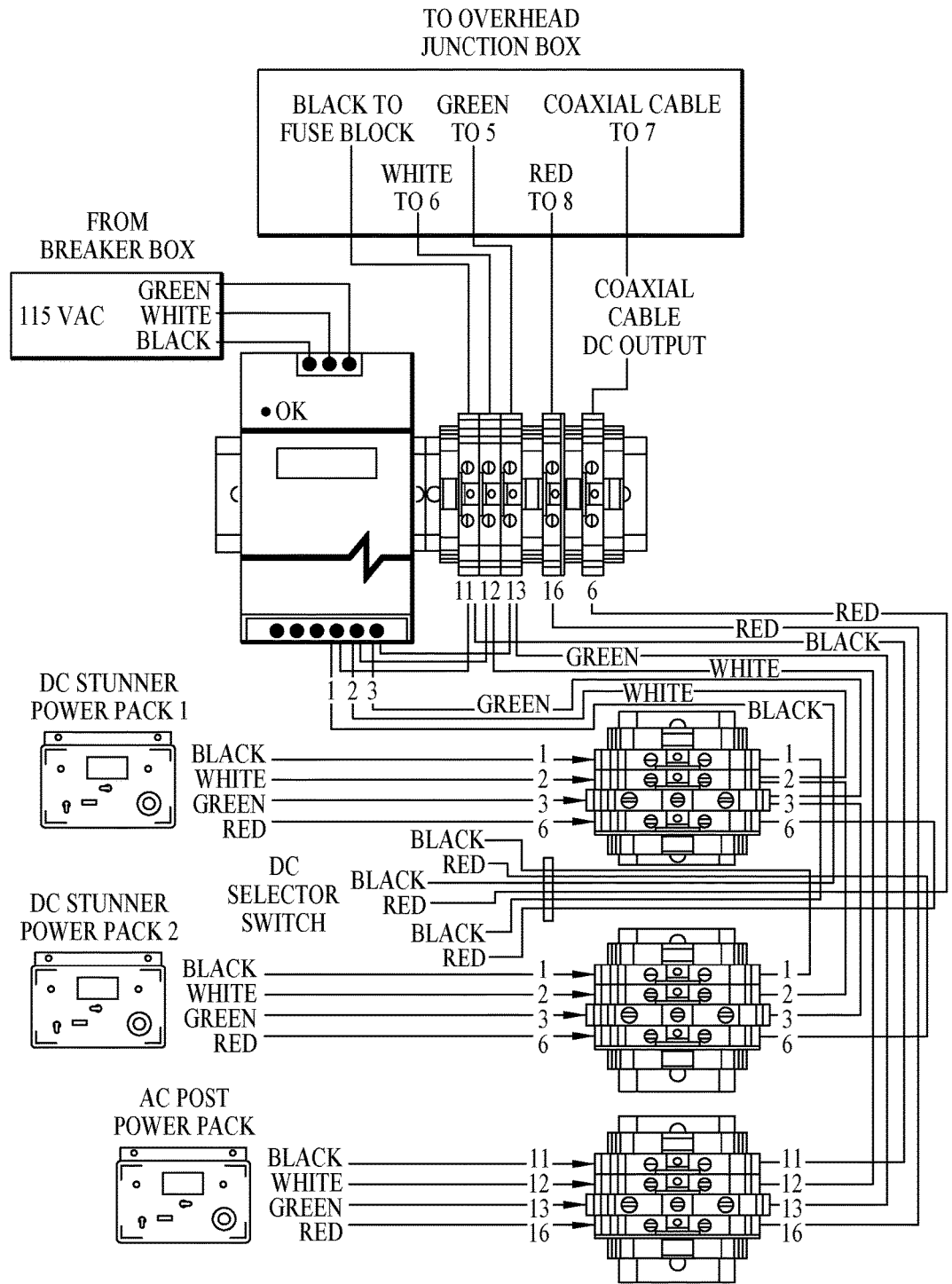
FIG. 6B is a schematic view of a wiring diagram of the electronics housing and contents thereof of FIG. 6A.

As shown in FIGS. 6A and 6B, the stunner control panel consists of a NEMA 4X stainless steel enclosure containing (2) Simmons DC power packs and (1) Simmons AC power pack. Also included in the panel is (1) power conditioner and (1) primary/secondary DC power pack selector switch.

The DC power pack operates by converting standard AC voltage (115-120 VAC) to low voltage high frequency DCV. The DC voltage and amperage are displayed through a digital display located on the face of the DC power pack enclosure. The DC power pack also includes a variable transformer to raise or lower the voltage going to the DC stunner grate and an on/off switch. The AC power pack uses standard AC voltage as an input (115-120 VAC). The applied voltage is displayed through a digital display located on the face of the AC power pack enclosure. The AC power pack also includes a variable transformer to raise or lower the voltage going to the AC stunner grate and an on/off switch.

The stunner controller operates to control the DC and AC voltages applied to the bird, as described herein.

In operation, the legs of the poultry are connected to the kill line shackles 13, and the poultry are conveyed upside-down along the overhead track 14 from the DC stunner contact grate 18 towards the AC stunner contact grate 28. The salt water injection system 31 injects a sufficient amount of salt water into the DC stunner section 17 of the stunner cabinet 11 such that, as the poultry are conveyed along the overhead track 14, the heads of the poultry are sufficiently submerged in the salt water to cause an electrical connection for a pulsating DC current to flow from the DC stunner grate 18 to the kill shackles 13. This electrical connection enables the pulsating DC current to flow through the poultry such that the poultry are stunned effectively.

According to an illustrative embodiment, as the poultry are conveyed toward the AC stunner contact grate 28, the heads of the poultry emerge from the salt water solution. As the head of the poultry comes into contact with the AC stunner contact grate 28, the head of the poultry is damp enough to create an electrical pathway through the poultry for the AC current to flow from the AC stunner grate 28 to the kill shackles 13, such that the poultry is immobilized.

The strength (voltage) of the DC current, the strength (voltage) of the AC current, and the dwell time of the AC current may be varied depending upon, e.g., the size of the poultry, etc. For example, the DC current may be applied as a pulsating square wave with peaks between zero volts and about 60 volts (0 VDC and 60 VDC). Preferably, the DC voltage is cycled as a square wave with a frequency of about 500 Hz (cycles per second), with a duty cycle of about 25%, resulting in an average DC voltage of about 15 VDC.

Optionally, the AC current is applied at a medium voltage of between about 60 and 250 VAC. Preferably, the AC current is applied at a voltage of between about 60 and 130 VAC. Most preferably, the AC current is applied at a voltage of between about 70-90 VAC.

Ideally, the lowest AC current is about 70 VAC. It should be appreciated that lower AC currents may also work to immobilize the poultry, but not as effectively. Preferably, the dwell time (time of application of the AC current) is between about 2 and 10 seconds, and most preferably is between about 2 and 5 seconds. Preferably, the AC current is provided at a frequency of about 50-60 Hz.

According to an illustrative embodiment, the application of DC current followed by AC current in the manner described above is effective to stun and then immobilize poultry and to relax the muscles of the stunned poultry, while at the same time avoiding or minimizing damage to the poultry tissue. This results in a generally "irreversible stun" from which poultry would not normally recover.

In a preferred form, the present invention relates to a method 50 as shown in FIG. 7, in which according to a first step 51 the bird is passed through the stunner apparatus. In the second step 52, the DC voltage is applied to stun the bird. In the third step 53, the AC voltage is applied to immobilize the bird. And in the fourth step 54, the bird exits the stunner apparatus.

As shown in FIG. 3, the stunner cabinet 11 has a recess for receiving an alternate embodiment stunner/killer electrode plate and trough (shown in broken lines). FIGS. 8-11 depict an exemplary trough 60 and stunner/killer electrode plate 62, according to an example embodiment of the present invention.

Figure 8:
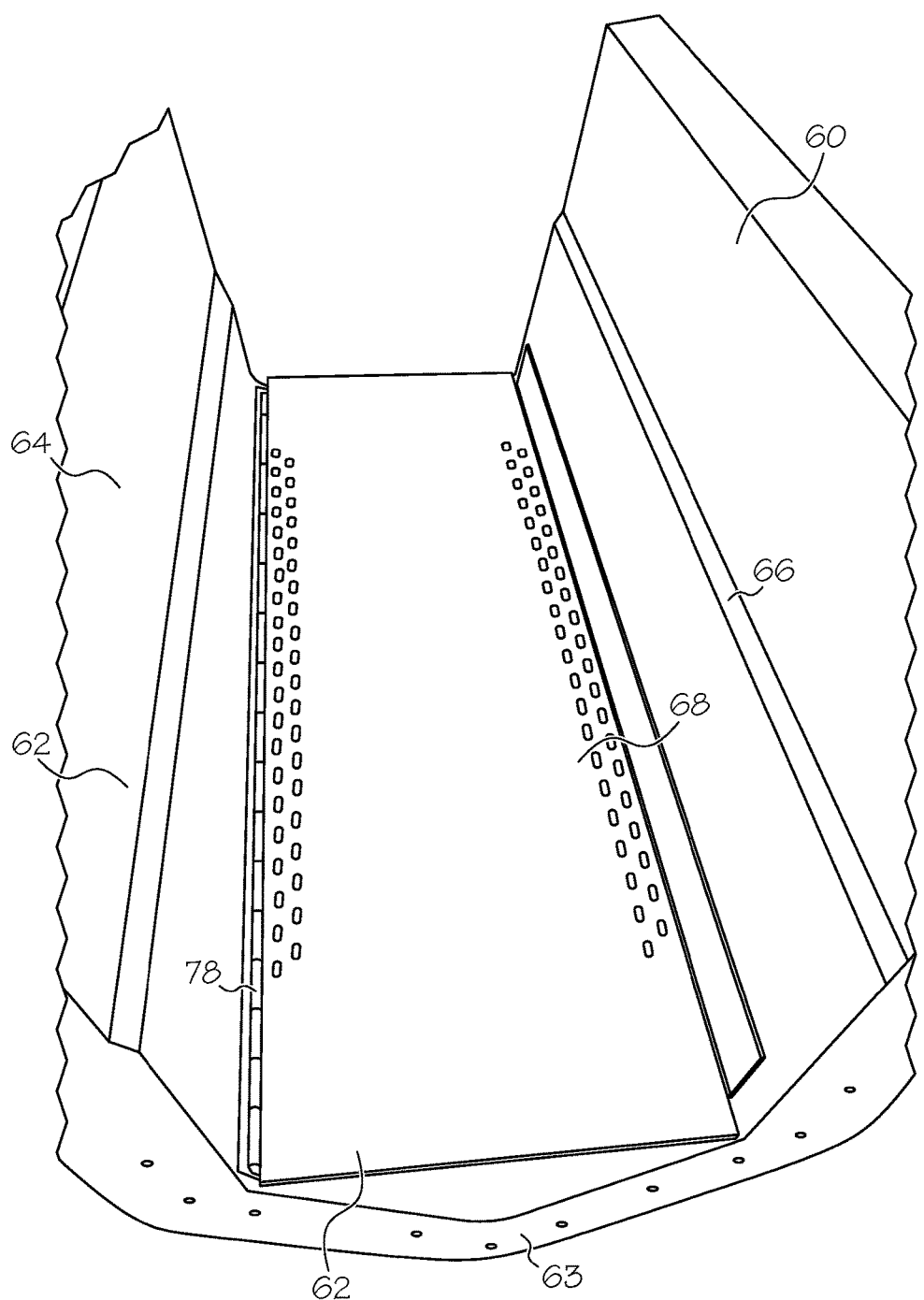
FIG. 8 is a perspective view of a stunner/killer electrode plate and trough for use with the stunning apparatus of FIG. 1.
Figure 9:
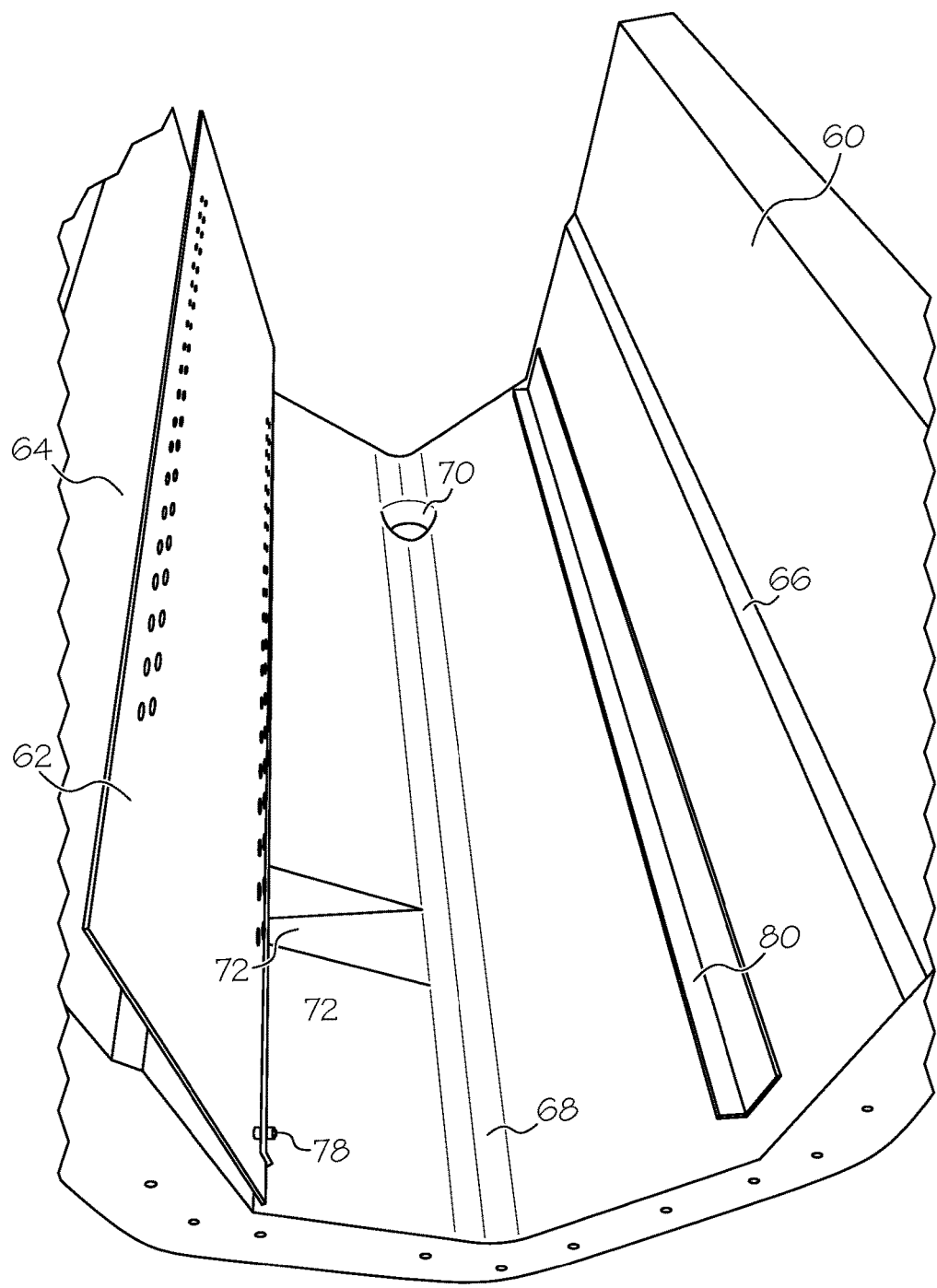
FIG. 9 is a perspective view of the stunner/killer electrode plate and trough of FIG. 8 with the electrode plate in a raised position.
Figure 10:
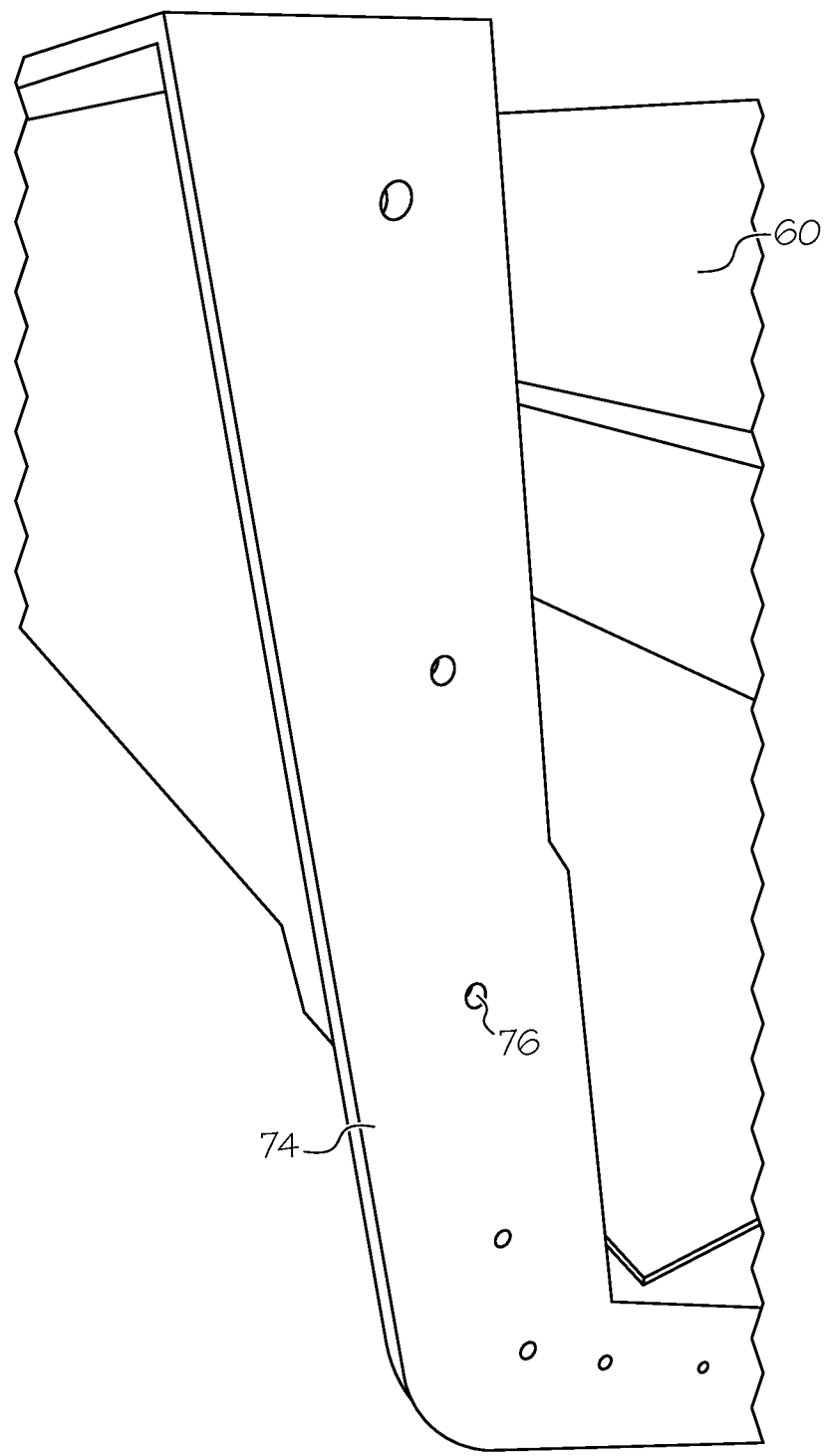
FIG. 10 is a perspective view of the trough of FIG. 8.

As shown in FIGS. 8-10, the trough 60 has a first side 64, a second side 66, and a bottom portion 68. The trough 60 is generally U-shaped or V-shaped. The trough 60 is made of any non-conducting material. In example embodiments, the trough 60 is made of fiberglass with a smooth, gel coating on all surfaces. As shown in FIG. 9, the bottom portion of the trough 68 has a drainage hole 70 for allowing water and/or waste to exit the trough 60. The bottom portion of the trough 70 may also have an opening 72 for admitting water and/or other substances into the trough 60. As shown in FIG. 10, each end of the trough 60 includes a mounting flange 74 with a plurality of fastener holes 76 for coupling the trough 60 to adjacent elements of the processing line. This design allows for modularity of the trough 60 so that additional sections can be added without replacing the entire system.

Figure 11:
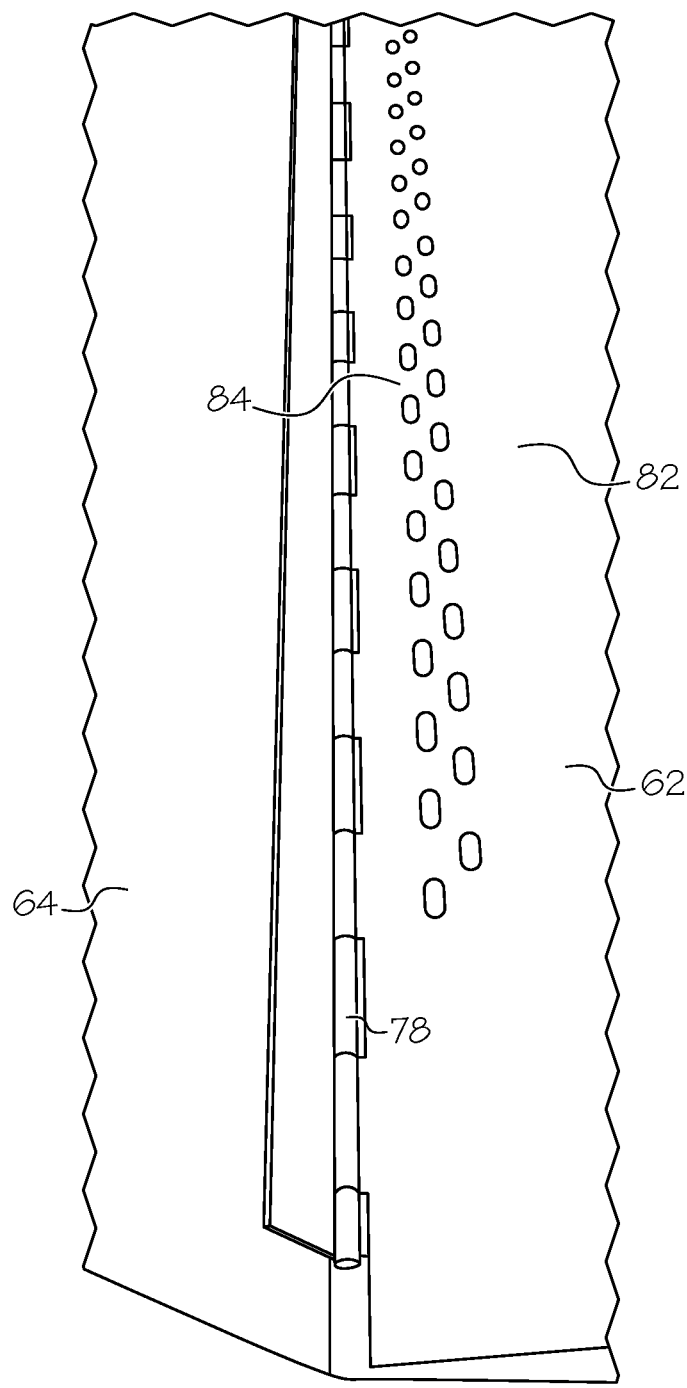
FIG. 11 is a perspective view of the stunner/killer electrode plate and trough of FIG. 8.

As seen in FIGS. 8, 9, and 11, preferably the electrode plate 62 is pivotally coupled to the trough 60 via a piano hinge 78. In example embodiments, the hinge 78 is coupled to the first side of the trough 64 and to the electrode plate 62 using any suitable fastening means (e.g., nuts, screws, bolts, rivets, etc.). The hinge 78, in alternate embodiments, may be integrally formed with the electrode plate 62. Similar to the electrode plate 62, preferably the hinge 78 is made of stainless steel. In example embodiments, the coupling of the hinge 78 to the trough 60 includes a seal for preventing waste and/or water from passing through the first side of the trough 64 at the hinge coupling. The hinge 78 may be any suitable hinge (e.g., piano hinge, butt hinge, surface-mount hinge, spring-loaded hinge, etc.). In a preferred embodiment, the hinge 78 is a continuous piano hinge. The hinge 78 allows the electrode plate 62 to pivotally rotate between a substantially horizontal, lowered position (as shown in FIG. 8) and a substantially vertical, raised position (as shown in FIG. 9). The raised position permits easy access for cleaning and/or other maintenance of the trough 60. A shelf 80 is positioned on the second side of the trough 66 for supporting the electrode plate 62 in a level orientation and also preventing the electrode plate 62 from further rotation into the bottom portion of the trough 68. In example embodiments, the shelf 80 is made of stainless steel. Similar to the hinge 78, in example embodiments, the shelf 80 may be coupled to the second side of the trough 66 using any suitable fastening means. In addition, a second seal may be utilized to prevent water and/or waste from passing through the second side of the trough 66 at the shelf coupling.

Referring to FIGS. 8 and 11, the electrode plate 62 is made of electrically conductive material, such as stainless steel. The electrode plate 62 has a contact zone 82 for contacting the poultry as the poultry is carried along by the overhead conveying track. The electrode plate contact zone 82 is substantially smooth and uninterrupted. Optionally, the electrode plate 62 also has a plurality of drainage holes 84 at the outer edges of the electrode plate 62 and outside of the contact zone 82. The drainage holes 84 may be any suitable shape and any suitable size for allowing waste and water to pass through.

It is believed that the smooth, uninterrupted contact zone 82 of the electrode plate 62 provides a greater contact patch with the poultry during stunning. This is believed to minimize damage to the product by spreading the electrical energy being applied to the poultry to a larger area, minimizing localized damage to the product. It also maintains more continuous contact. Note that the birds are traveling along at substantial speed during stunning, such that the use of a grate-style electrode (as is the norm in the industry) results in a non-continuous contact at locations on the bird as the bird moves forward. The smooth, uninterrupted contact patch allows the parts of the poultry in contact with the electrode to remain in continuous contact during the stunning, resulting in improved stunning with less damage to the product.

The trough 60 and electrode plate 62 are further coupled to an electrical control module (not shown or numbered). In example embodiments, the electrical control module applies a DC current to the poultry via the electrode plate 62 at a voltage sufficient to stun the poultry. The DC current may be a pulsating DC current that operates at a relatively low voltage (9-30 volts). In some embodiments, the electrical control module applies an AC current to the poultry via the electrode plate 62 at a particular voltage and for a particular period of time sufficient to immobilize and relax the muscles of the stunned poultry. In example embodiments, the electrical control module is configured to apply a DC current to stun the poultry and an AC current to immobilize the stunned poultry. Similar to the embodiments discussed above (FIGS. 1-7), the overhead shackle line carrying the birds is at a polarity which is opposite to the polarity of electricity being supplied to the electrode plate 62. Thus, an electrical circuit, through the body of the poultry is made for stunning and immobilizing the poultry when the bird comes into contact with the contact zone 82 of the electrode plate 62.

While the invention has been shown and described in exemplary forms, it will be apparent to those skilled in the art that many modifications, additions, and deletions can be made therein without departing from the spirit and scope of the invention as defined by the following claims.

We claim:

1. A poultry stunning apparatus, comprising:
    a trough for containing water through which the poultry is carried for stunning, the trough having first and second open ends for permitting the poultry to be carried along through the trough;
    an electrical control module configured to apply a DC current to the poultry at a voltage sufficient to stun the poultry; and
    a stunning electrode positioned within the trough and wherein the stunning electrode is pivotally mounted within the trough, the stunning electrode comprising a substantially smooth metal plate adapted and positioned within the trough and comprising a contact zone for contacting the poultry as the poultry is carried along through the trough, the contact zone of the metal plate being substantially smooth and uninterrupted.

2. The poultry stunning apparatus of claim 1, wherein the stunning electrode includes drainage holes in edge portions of the stunning electrode, outside of the contact zone.

3. The poultry stunning apparatus of claim 1, wherein the stunning electrode is mounted for pivotal motion by way of one or more hinges.

4. The poultry stunning apparatus of claim 1, wherein the electrical control module is configured to apply AC current to the stunned poultry at a voltage and for a period of time sufficient to immobilize and relax the muscles of the stunned poultry.

5. The poultry stunning apparatus of claim 1, wherein the stunning electrode is mounted within the trough for pivotal motion between a lowered position and a raised position.

6. The poultry stunning apparatus of claim 1, wherein the stunning electrode is mounted within the trough for pivotal motion between a lowered, substantially horizontal position and a raised, substantially vertical position.

7. A poultry stunning apparatus, comprising:
    a trough for containing water through which the poultry is carried for stunning;
    an electrical control module configured to apply electric current to the poultry to stun the poultry; and
    a stunning electrode positioned within the trough, wherein the stunning electrode is mounted for pivotal motion by way of one or more hinges, the stunning electrode comprising a metal plate including a contact zone portion thereof adapted and positioned within the trough to be contacted by the poultry as the poultry is carried along, wherein the stunning electrode is pivotally mounted within the trough for pivotal movement between a lowered position and a raised position.

8. The poultry stunning apparatus of claim 7, wherein the stunning electrode is mounted to a first side of the trough.

9. The poultry stunning apparatus of claim 7, wherein the contact zone of the metal plate is substantially smooth and uninterrupted.

10. The poultry stunning apparatus of claim 9, wherein the stunning electrode includes drainage holes in edge portions of the stunning electrode, outside of the contact zone.

11. A trough for a poultry stunning apparatus, comprising:
    a generally V-shaped trough having a first side, a second side, and a bottom portion;
    a stunning electrode pivotally coupled to the trough, wherein the stunning electrode is pivotally coupled to the trough by way of one or more hinges, the stunning electrode comprising a metal plate adapted and positioned within the trough to be contacted in a contact zone by the poultry as the poultry is carried along.

12. The trough for the poultry stunning apparatus of claim 11, wherein the pivotal rotation of the stunning electrode into the bottom portion of the trough is limited by way of a shelf.

13. The trough for the poultry stunning apparatus of claim 11, wherein the contact zone of the metal plate is substantially smooth and uninterrupted.

14. The trough for the poultry stunning apparatus of claim 11, wherein the trough is made of a non-conductive material.

15. The trough for the poultry stunning apparatus of claim 11, wherein the trough is made of fiberglass.

* * * * *